Nov. 24, 1942.   H. HELBIG   2,302,944

LAWN PERFORATING MACHINE

Filed Sept. 5, 1941   3 Sheets-Sheet 1

INVENTOR
HUGO HELBIG
BY
ATTORNEYS

Nov. 24, 1942.  H. HELBIG  2,302,944
LAWN PERFORATING MACHINE
Filed Sept. 5, 1941  3 Sheets-Sheet 2
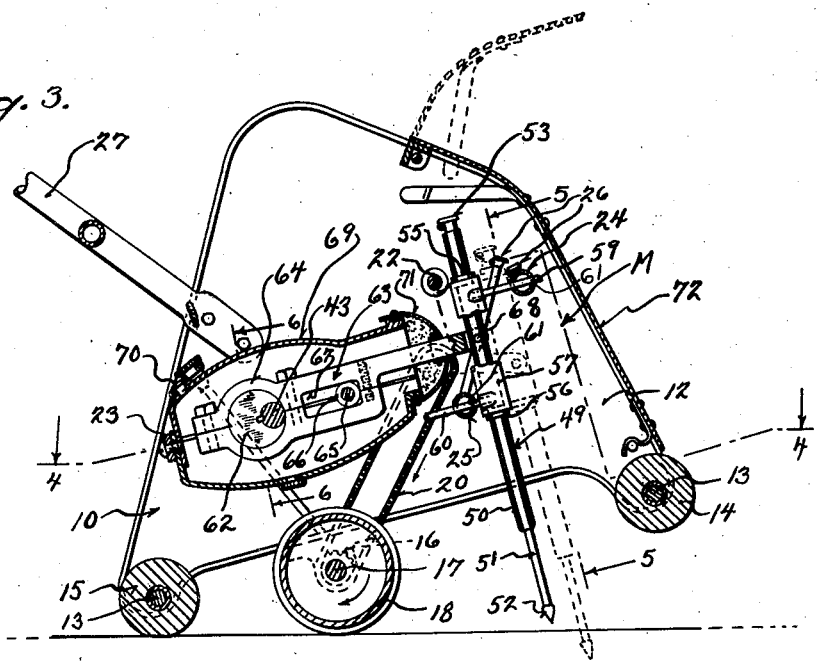
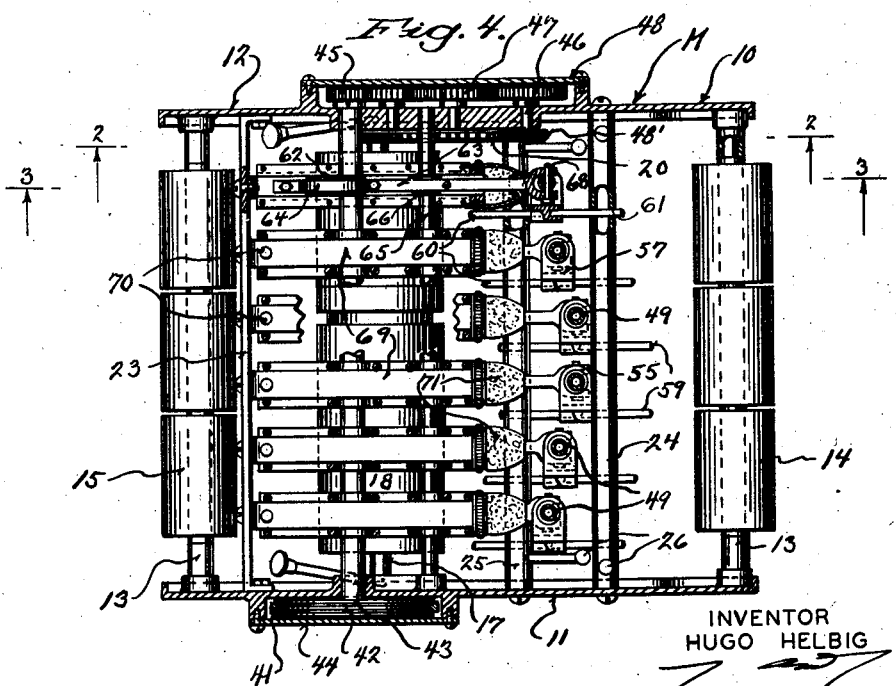
INVENTOR
HUGO HELBIG
BY
ATTORNEYS Nov. 24, 1942.  H. HELBIG  2,302,944
LAWN PERFORATING MACHINE
Filed Sept. 5, 1941    3 Sheets-Sheet 3
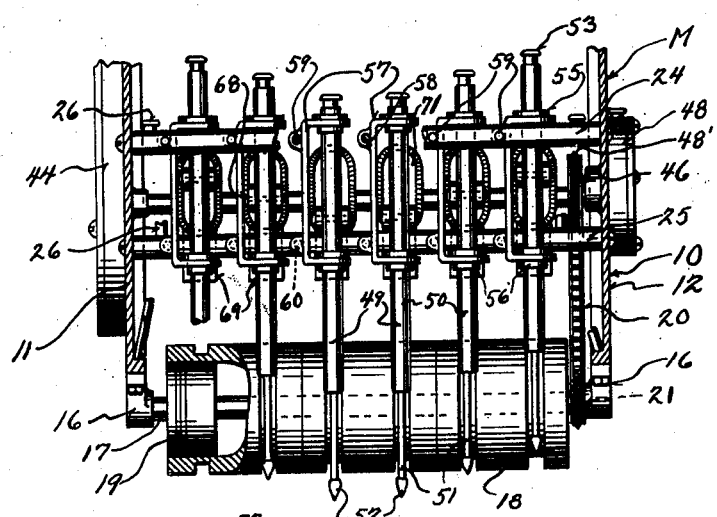
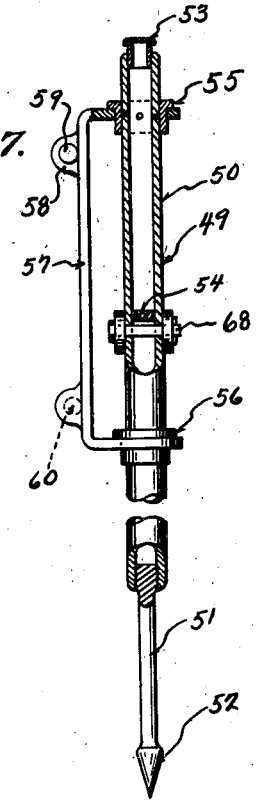
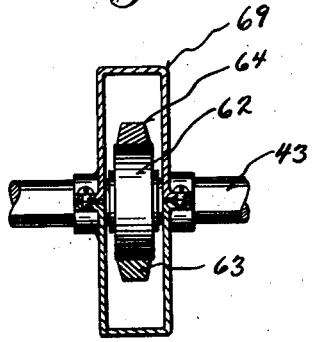
INVENTOR
HUGO HELBIG
BY
ATTORNEYS Patented Nov. 24, 1942

2,302,944

UNITED STATES PATENT OFFICE 2,302,944

LAWN PERFORATING MACHINE

Hugo Helbig, Racine, Wis.

Application September 5, 1941, Serial No. 409,607

5 Claims. (Cl. 97—36)

This invention appertains to lawn perforating machines and is an improvement over my prior Patent #2,255,040, issued to me September 9, 1941.

One of the primary objects of my present invention is to generally simplify the construction of the machine shown in my prior patent and to materially increase the operating efficiency thereof.

Another salient object of my invention is to provide novel means for actuating the reciprocating spikes from the cam shaft during the travel of the machine over the lawn by the employance of cam arms operated directly from said cam shaft.

A further object of my invention is to provide novel guide brackets for these spikes, whereby all binding of the spikes is eliminated and whereby the desired simultaneous vertical and horizontal reciprocation of the spikes will be had.

A further important object of my invention is the provision of novel means for forming the spikes themselves, whereby the guide brackets will be effectively lubricated during the reciprocation of said spikes.

A still further object of my invention is to provide novel means for constructing the frame, whereby the width of the machine can be increased or decreased by lengthening or shortening the brace rods and shafts between the side plates of the frame.

A still further important object of my invention is to provide an improved lawn perforating machine of the above character, which will be durable and efficient in use, one that will be simple and easy to manufacture and one which can be placed upon the market at a reasonable cost.

With these and other objects in view the invention consists in the novel construction, arrangement and formation of parts, as will be hereinafter more specifically described, claimed and illustrated in the accompanying drawings, in which—

Figure 3 is a view similar to Figure 2, but taken on the line 3—3 of Figure 4 looking in the direction of the arrows.

Figure 4 is a sectional view through the improved machine taken on the line 4—4 of Figure 3 looking in the direction of the arrows illustrating the manner of mounting the cam arms or levers on the frame of the machine.

Figure 5 is a fragmentary transverse sectional view through the machine taken on the line 5—5 of Figure 3 looking in the direction of the arrows.

Figure 6 is an enlarged detail sectional view taken on the line 6—6 of Figure 3 looking in the direction of the arrows illustrating the means employed for actuating one of the cam arms or levers from the cam shaft.

Figure 7 is an enlarged detail sectional view illustrating the formation of one of the spikes and the mounting thereof in its novel guide bracket.

Figure 1:
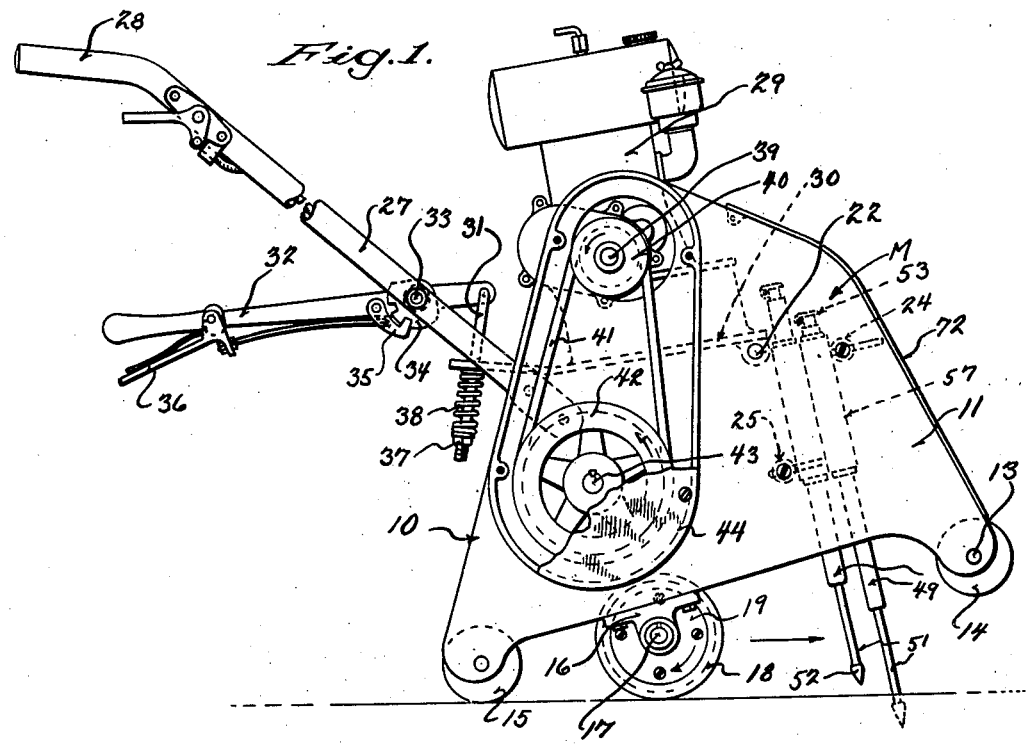
Figure 1 is a side elevational view of my improved machine.
Figure 2:
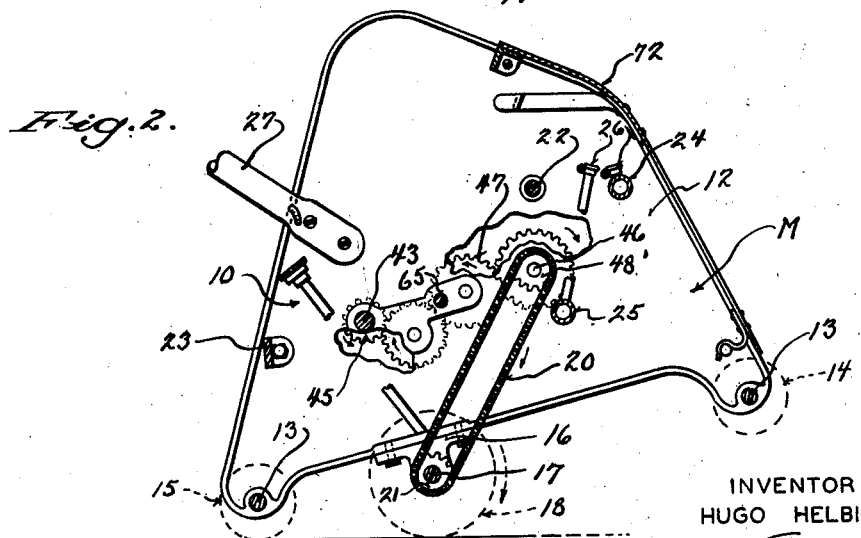
Figure 2 is a longitudinal sectional view through my improved machine taken on the line 2—2 of Figure 4 looking in the direction of the arrows.

Referring to the drawings in detail, wherein similar reference characters designate corresponding parts throughout the several views, the letter M generally indicates my novel lawn perforating machine. This machine M includes a frame 10 composed of side frame plates 11 and 12. These frame plates can be in the nature of castings and the front and rear lower corners thereof have connected thereto shafts 13 for receiving front and rear lawn rollers 14 and 15. The rollers 14 and 15 can be constructed from any desired material, such as wood and are preferably formed in sections so as to facilitate turning of the machine. The side frame plates 11 and 12 between the front and rear shafts 13 have connected thereto depending bearing brackets 16 for rotatably receiving the main propelling shaft 17. This shaft has mounted thereon the main drive or propelling roller 18. The roller 18 is also preferably formed in sections arranged in relatively tight contact. The end sections of the main roller 18 are operatively connected to the shaft 17 by the use of friction clutches 19. One of the friction clutches 19 is driven from a sprocket chain 20 which is trained about a sprocket wheel 21, secured to the propelling shaft 17. By referring to Figures 1 and 3, it can be seen that the main supporting and drive roller 18 is arranged closer to the rear ground roller 15 than the front ground roller 14 and hence the machine is normally supported on the ground by the rear roller 15 and the main roller 18.

The frame 10 is further braced by a cross rod 22 and a rear brace strap 23. These members are firmly secured to the side frame plates 11 and 12. Upper and lower hollow guide tubes 24 and 25 also extend across the frame and are rigidly secured to the side frame plates. These hollow tubes 24 and 25 also serve to brace the frame and these tubes are out of vertical alignment and are adapted to be filled with a lubrication through suitable filling spouts 26, for a purpose, which will be later set forth. Rigidly bolted to the side plates 11 and 12 are upwardly and rearwardly extending manipulating handles 27 and these handles can terminate in hand grips 28. The handles can be braced by transverse cross members, if so desired. The operator by taking hold of the hand grips can guide the machine over the ground.

The machine is adapted to be propelled and operated from a suitable motor which can be in the nature of a small internal combustion engine 29. This engine 29 is mounted upon a suitable platform 30 and the platform is in turn rockably mounted at its forward end on a transverse brace bar 22. The platform 30 extends rearwardly beyond the frame and is provided with an aperture for slidably receiving a guide and supporting link 31. The upper end of the link is pivotally connected to a supporting and operating hand lever 32. This operating lever 32 is rockably mounted adjacent to its forward end, on a connecting cross brace rod 33 for the handles. Rigidly secured to one of the handles is a sector rack 34.

Cooperating with the sector rack 34 is a pivoted dog 35 carried by the lever 32. This dog can be moved into locking engagement with the notches or teeth of the rack by means of a pivoted hand grip 36 mounted on said handle. The lower end of the link 31 has adjustably mounted thereon a stop 37 and a spring which is coiled about the link 31 is confined between the stop and the rear end of the engine platform 30. Thus the rear end of the platform is resiliently supported from the hand lever 32 and by manipulating the hand lever the engine platform can be raised and lowered.

The internal combustion engine 29 can be of any well known make and the same includes the usual crank shaft 39 and this crank shaft has keyed or otherwise secured thereto a pulley wheel 40. Trained about the pulley wheel 40 is a drive pulley belt 41 and this belt is in turn trained about a relatively large pulley wheel 42 keyed or otherwise secured to a transverse extending cam shaft 43. This cam shaft is rotatably mounted in suitable bearings carried by the side frame plates.

The pulley wheels and the pulley belt are preferably enclosed in a suitable housing 44 which can be carried by the side frame plate 11. The end of the cam shaft 43, which is remote from the pulley wheel 42 has secured thereto a gear wheel 45. This gear wheel 45 is connected to a stub shaft 46 through the use of a suitable train of gearing 47. This gearing can be enclosed in a gear case 48 carried by the frame plate 12. The stub shaft 46 also has rigidly secured thereto a sprocket wheel 48' and the sprocket wheel 48' has trained thereabout the sprocket chain 20 which is trained over the sprocket wheel 21.

From the description so far, it can be seen that the cam shaft 43 is power driven as well as the main ground roller 18. The belt 41 is loose on the pulley wheel 40, and by manipulating the lever 32 the engine 29 and its platform 30 can be raised to tighten the belt 41 so as to bring about the driving of the cam shaft 43 and the main ground roller 18. When it is desired to allow the engine to run free the lever 32 is manipulated so as to lower its inner end and the platform 30 and this action loosens the belt 41.

Mounted in front of the cam shaft 43 are the lawn perforating spikes 49. There can be as many of the spikes as is desired and the spikes are mounted in a transverse row adjacent to the front of the machine. Each of the spikes include a hollow elongated body portion 50 and a depending solid shank portion 51. The lower ends of each of the shank portions 51 terminate in a sharp pointed head 52. The upper terminals of the hollow body portions 50 are closed by dust caps 53 and these hollow body portions are adapted to be filled with a lubricating oil. By referring to Figure 7 it can be seen that a felt or similar washer or disc 54 is placed in the hollow body portion of each spike and serves to limit the flow of lubricant to the bottom of the body portions.

Each spike is slidably mounted in upper and lower bearings 55 and 56 carried by the arms of a U shaped bearing bracket 57. Each bearing bracket adjacent to its opposite ends is provided with ears 58 and these ears in turn carry oppositely extending slide or guide rods 59 and 60. These guide or slide rods 59 and 60 extend through guide openings 61 (see Figures 3 and 4) formed in the upper and lower hollow rods or tubes 24 and 25. As these tubes are filled with a lubricant the rods 59 and 60 will be effectively lubricated during the reciprocation thereof as will be later brought out.

The cam shaft 43 has formed thereon or secured thereto a plurality of eccentrics or cams 62. The cams correspond in number to the spikes 49 and hence a cam is arranged in rear of each spike. The spikes are driven directly from the cams 62 by the use of rock or cam arms 63. The rear ends of the rock or cam arms carry cam straps 64 which embrace the cams or eccentrics 62. The cam or rock arms 63 are guided or supported intermediate therein on a cross shaft 65 which is also connected to the side frame plates 11 and 12 and this shaft has mounted thereon anti-friction rollers 66 which are received in guide tracks 67 or ways formed in said cam or rock arm 62. The forward terminals of the rock or cam arm 63 are bifurcated and embrace the spikes 49 below the felt discs 54. A cross pin 68 pivotly connects the forward end of each arm to its spike as can be clearly seen by referring to Figures 4 and 5. The action is best shown in the detailed view of the drawing, Figure 7.

I preferably enclose each of the cams 62 and each of the cam or rock arms 63 in a suitable casing 69 whereby the cams and the cam arms will be protected from dirt and dust. This casing 69 can also be filled with a quantity of lubricating oil to facilitate the lubricating of cams, rollers 66 and the like. The casing 69 can be made in sections and securely bolted to the cross brace strap 23. Also each casing is provided with an oil filling spout 70. The front of the casings are enclosed by flexible diaphragms or leathers 71 and the forward terminals of the cam or rock arm 63 extend through these leathers and hence the cam arms can move relative to their cases.

In operation of my machine the engine 29 is started in the usual manner and the belt 41 is tightened by manipulating the lever 32. This will bring about the driving of the cam shaft 43 and the main ground roller 18. As the cam shaft rotates the cam or rock arm 63 will be oscillated and hence the spikes 49 will be rapidly set in motion. As the spikes are carried by the guide straps 57, which are in turn slidably supported by the tubes 24 and 25 a simultaneous vertical and horizontal movement will be transmitted to the spikes. It will be readily understood that as the machine moves over the ground by the action of the roller 18, the spikes will be projected into the ground by the cams and cam arms and at the same time shifted vertically and longitudinally on the machine by the novel mounting of the spikes.

All the parts of the machine are effectively lubricated and by referring to the spikes it can be seen that oil will seep past the porous disc 54 and will creep out of the openings surrounding the pivot pin 68. Thus these pins will be lubricated and the oil flowing down the spikes will lubricate the lower bearing 56. The spikes adjacent to their upper ends can be provided with minute oil escape openings to permit the lubrication of the upper bearings 55.

Great stress is laid on the fact that I can readily change the width of the machine by using different lengths of brace rods, shafts and the like and hence different size machines can be made with the use of the same side frame plates 11 and 12.

If preferred, the main ground roller 18 can be grooved in rear of each of the spikes and this will prevent the closing up of the perforations made by the spikes during the movement of the roller 18 over the lawn.

The front of the machine can be provided with a swinging cover 72 and this cover will aid in protecting various moving parts against dust or dirt and likewise prevent accidents occurring from persons placing their hands in the machine.

While I have shown and described specifically a gang of compensating plungers associated with the eccentric actuated rock arms 63, I may for simplicity in production form a rigid spike in connection with the arm which would be shaped upon an arc of a circle concentric with the shaft 64, whereby the spikes would enter the sod and be extracted without scraping or digging.

Various changes in detail may be made without departing from the spirit or the scope of my invention, but what I claim as new is:

1. A lawn perforating machine comprising a mobile frame, a power unit mounted on said frame, a cam shaft rotatably mounted on said frame and extending transversely across the frame, a plurality of spikes mounted on said frame in front of the cam shaft for vertical and horizontal reciprocative movement, and means for operatively connecting each of these spikes with the cam shaft, said last named means including cam arms actuated from said cam shaft, a support for the intermediate portions of said cam arms and means pivotally connecting the forward ends of such arms to said spikes.

2. A lawn perforating machine comprising a mobile frame, a power unit mounted on said frame, a cam shaft extending transversely across the said frame including a plurality of cams, means for driving the cam shaft from said power unit, a plurality of spikes mounted on said frame in front of said cam shaft for vertical and horizontal reciprocative movement, a supporting shaft extending transversely across the frame and arranged between the cam shaft and said spikes, a cam arm for each spike having a guide way receiving said supporting shaft and a cam strap encircling the cams, and means pivotally connecting the forward end of each cam arm to a spike.

3. A lawn perforating machine comprising a mobile frame, a power unit mounted on said frame, a plurality of spikes arranged adjacent to the front of said frame, upper and lower guide members extending transversely across the frame arranged on opposite sides of the spikes, a substantially U shaped guide bracket for each spike having bearings at its opposite ends in which the spikes are mounted, oppositely extending guide rods secured to the opposite ends of each guide bracket slidably mounted in said guide members, and means for operating the spikes from the power unit.

4. In a lawn perforating machine, a mobile frame, a power unit mounted on said frame, a lawn perforating spike including an elongated hollow body portion and a solid shank provided with a pointed head, transversely extending guide members connected to the frame and disposed on opposite sides of the spike, a U shaped guide bracket having bearings at its opposite ends slidably receiving the hollow body portion of the spike, oppositely extending guide rods secured to the opposite ends of the bracket slidably mounted in said guide members, means for operating the spike from said power unit including a rock arm, a transversely extending pin extending through the hollow body portion of the spike and connecting the spike to the arm, said hollow body portion being adapted to receive a lubricant whereby said lubricant will flow around the pivot pin to the outer surface of said spike for lubricating the bearings for the spike.

5. In a lawn perforating machine, a mobile frame, a power unit mounted on said frame, a lawn perforating spike including an elongated hollow body portion and a solid shank provided with a pointed head, transversely extending guide members connected to the frame and disposed on opposite sides of the spike, a U shaped guide bracket having bearings at its opposite ends slidably receiving the hollow body portion of the spike, oppositely extending guide rods secured to the opposite ends of the bracket slidably mounted in said guide members, means for operating the spike from said power unit including a rock arm, a transversely extending pin extending through the hollow body portion of the spike and connecting the spike to the arm, said hollow body portion being adapted to receive a lubricant whereby said lubricant will flow around the pivot pin to the outer surface of said spike for lubricating the bearings for the spike, said guide members being hollow for receiving a lubricant to oil the guide rods.

HUGO HELBIG.